US007904537B2

(12) United States Patent
Lim et al.

(10) Patent No.: US 7,904,537 B2
(45) Date of Patent: Mar. 8, 2011

(54) ARCHITECTURE FOR ONLINE COMMUNAL AND CONNECTED EXPERIENCES

(75) Inventors: Tian Lim, Seattle, WA (US); Thomas A. Langan, Seattle, WA (US); Vipul Hingne, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 369 days.

(21) Appl. No.: 12/013,324

(22) Filed: Jan. 11, 2008

(65) Prior Publication Data

US 2009/0182817 A1 Jul. 16, 2009

(51) Int. Cl.
*G06F 15/173* (2006.01)
(52) U.S. Cl. .......... 709/223; 709/217; 709/203; 709/246
(58) Field of Classification Search .......... 709/238–239, 709/223, 217–218, 226, 203, 246; 717/101
See application file for complete search history.

(56) References Cited

U.S. PATENT DOCUMENTS

| | | | |
|---|---|---|---|
| 6,999,082 B2 | 2/2006 | Nishimura | |
| 7,090,582 B2 | 8/2006 | Danieli et al. | 463/35 |
| 7,213,236 B2* | 5/2007 | Gibbons | 717/136 |
| 7,216,181 B1 | 5/2007 | Jannu et al. | |
| 7,321,939 B1* | 1/2008 | Porter | 709/238 |
| 2004/0199614 A1* | 10/2004 | Shenfield et al. | 709/220 |
| 2004/0237064 A1* | 11/2004 | Liu et al. | 717/101 |
| 2005/0149481 A1 | 7/2005 | Hesselink et al. | 707/1 |
| 2005/0262204 A1 | 11/2005 | Szeto et al. | 709/206 |
| 2006/0075383 A1* | 4/2006 | Moorthy et al. | 717/106 |
| 2006/0087987 A1 | 4/2006 | Witt et al. | 370/260 |
| 2006/0168001 A1 | 7/2006 | Lasater et al. | 709/205 |
| 2006/0258457 A1 | 11/2006 | Brigham | 463/36 |
| 2007/0026945 A1 | 2/2007 | Nguyen | 463/42 |
| 2007/0050822 A1 | 3/2007 | Stevens et al. | 725/74 |
| 2007/0066394 A1 | 3/2007 | Ikeda et al. | 463/37 |
| 2007/0174425 A1* | 7/2007 | Gousse et al. | 709/217 |
| 2007/0239895 A1* | 10/2007 | Alperin et al. | 709/246 |

FOREIGN PATENT DOCUMENTS

JP 11-045216 2/1999

OTHER PUBLICATIONS

Beale, R., "Supporting Social Interaction with Smart Phones," *IEEE CS and IEEE ComSoc in Pervasivecomputing*, 2005, 35-41.
De Waele, R., "Mobilize and Share with Mosh by Nokia," http://www.m-trends.org/2007/06/mobilize-and-share-with-mosh-by-nokia.html, 2007, downloaded 2007, 3 pages.
Dustdar, Dr., et al., "Architectural concern in distributed and mobile collaborative systems," Vitalab, downloaded 2007, www.infosys.tuwien.ac.at/teaching/courses/SWA/slides/5-Architectural_Concerns_in_DMC.pdf, Jan. 1997.
McGonigal, J., "SuperGaming: Ubiquitous Play and Performance for Massively Scaled Community," *Modern Drama*, 2005, 48(3), 471-497.

* cited by examiner

*Primary Examiner* — Philip B Tran
(74) *Attorney, Agent, or Firm* — Woodcock Washburn LLP (57) ABSTRACT

Various aspects are disclosed herein for an architecture for online communal and connected experiences. This architecture can be embodied in an application running a host computing device, where the application provides functionalities such as finding modules on local devices or hosted on online services, launching such modules, switching between a plurality of such concurrently running modules, and providing many-to-many text, voice, and video functionality. This application can also interface with managed runtime code on the host computing device, thereby providing inputting, outputting, and network communication means among a plurality of computing devices having different platforms.

17 Claims, 9 Drawing Sheets

ARCHITECTURE FOR ONLINE COMMUNAL AND CONNECTED EXPERIENCES

COPYRIGHT NOTICE AND PERMISSION

A portion of the disclosure of this document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007 Microsoft Corp.

FIELD OF TECHNOLOGY

The presently disclosed subject matter relates to the field of computing, and more particularly, to fields such media content, although this is merely an exemplary and non-limiting field.

BACKGROUND OF THE INVENTION

Entertainment devices, such as gaming consoles, gaming handhelds, music players, personal computers (PCs), and so on, have no structured, well defined means for users to communicate with each others—for instance, via video and/or voice. Moreover, such devices have no means to share data, such as photos, music, video, and so on in a consistent, robust, and rich manner. Thus, what is needed is an architecture that can provide a framework for cross-platform communication and sharing of data.

SUMMARY OF THE INVENTION

Various aspects are disclosed herein for an architecture for online communal and connected experiences. This architecture can be embodied in an application running a host computing device, where the application provides functionalities such as finding modules on local devices or hosted on online services, launching such modules, switching between a plurality of such concurrently running modules, and providing many-to-many text, voice, and video functionality. This application can also interface with managed runtime code on the host computing device, thereby providing inputting, outputting, and network communication means among a plurality of computing devices having different platforms.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are illustrated. However, the disclosure is not limited to the specific aspects shown. The following figures are included.

DETAILED DESCRIPTION OF ILLUSTRATIVE EMBODIMENTS

Figure 1:
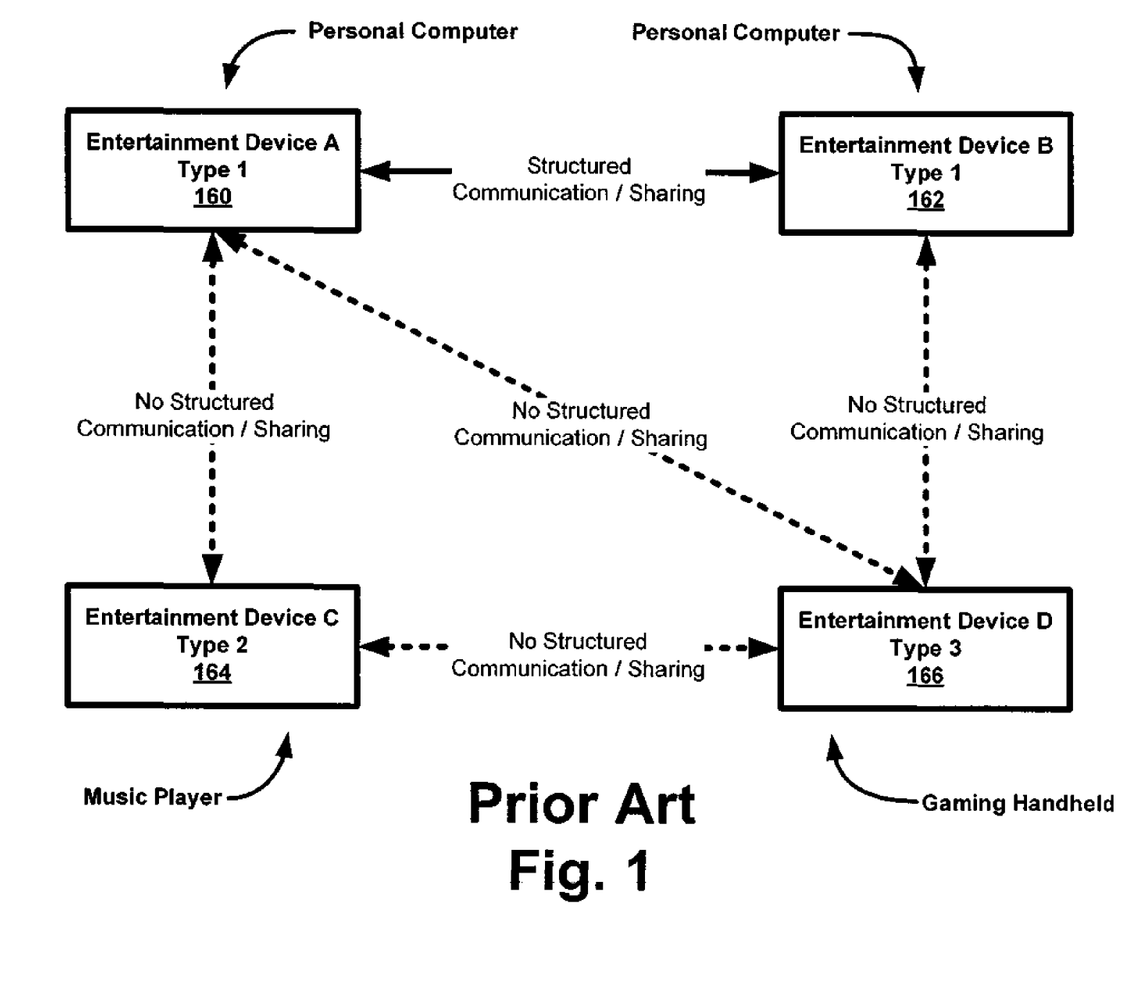
FIG. 1 illustrates a prior art system where entertainment devices of different types have no cross-platform architecture to communicate and share data.

FIG. 1 illustrates a prior art system where entertainment devices of different types have no cross-platform architecture to communicate and share data. Entertainment device A 160 may be of a type 1, and entertainment device B 162 may also be of type 1. Since both devices 160, 162 are of the same type, such as two personal computers (PCs), they may easily communicate via various protocols, such as an transmission control protocol/internet protocol (TCP/IP). In this scenario, there is a structured communication and sharing mechanism.

By way of contrast, devices of different types may not be able to communicate with one another in a structured manner, because of a lack of a common communication and sharing mechanism. In FIG. 1, entertainment device A 160 may be of type 1, namely, a PC, and entertainment device C 164 may be of type 2, for example, a music player. These two devices, a PC and a music player may not be able to communicate in a rich and extensive manner. Of course, basic interaction between devices of different types may exists, such as basic text or other straightforward data sharing, however, the contents of one device—for the most—part may be unintelligible to the other device (and vice versa).

Such lack of structured cross platform communication and sharing of data may be applicable to a plurality of devices. FIG. 1 illustrates that entertainment device A 160, of type 1, may also not be able to communicate in a structured manner with entertainment device D, that is of type 3. Type 3 devices 166, gaming handhelds, for instance, may not be able to communicate with type 2 devices 164, music players, and so on.

Figure 2:
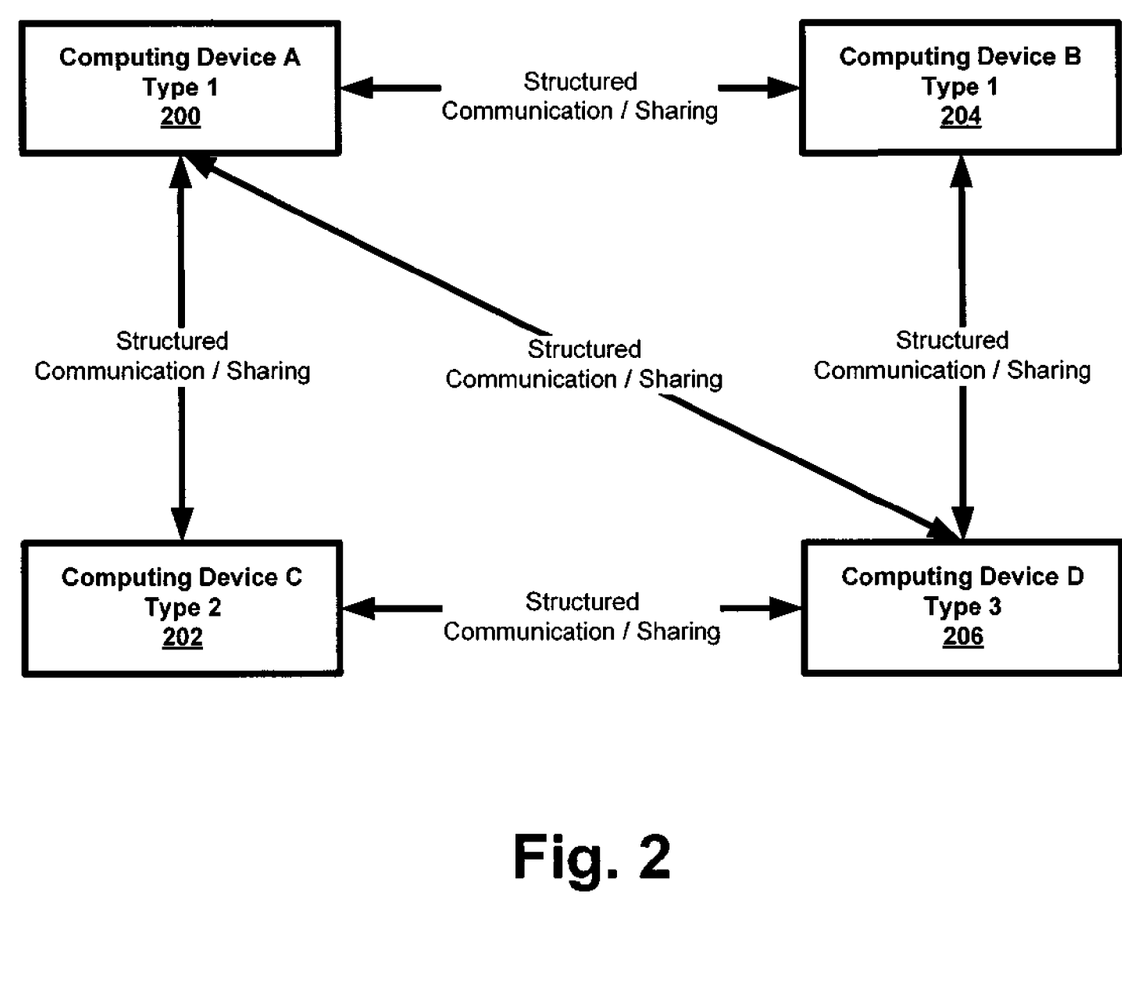
FIG. 2 illustrates that there is a structured cross-platform mechanism for various devices of various types (and of the same type) that can allow for communication and sharing of data.

In contrast to FIG. 1, FIG. 2 illustrates provided there is a structured cross-platform mechanism, various devices of various types (and of the same type) can easily communicate with each other and share data. Thus, per FIG. 2, computing device A 200 of type 1 can interact with computing device C 202 of type 2; it can interact with computing device D 206 of type 3; and, it can interact with computing device B 204 that is of the same type, type 1, as itself.

Such interaction, which may include communication and/or sharing of data, among other functionalities, may include but is not limited to: voice, text, and/or video communication, sharing of photos, music (including audio files), video, and so on. In short, the interaction may involve any kind of digital content. Such interaction may be performed in real-time or not, depending on the need. Moreover, it does not have to be limited to 1:1 interaction, instead it may involve a plurality of users and/or computing systems. In this setup, communal experiences can be sustained by communicating and sharing content across multiple platforms, whether these platforms run on PCs, gaming consoles, music players, cell phones, personal digital assistants (PDAs), and so on.

Figure 3:
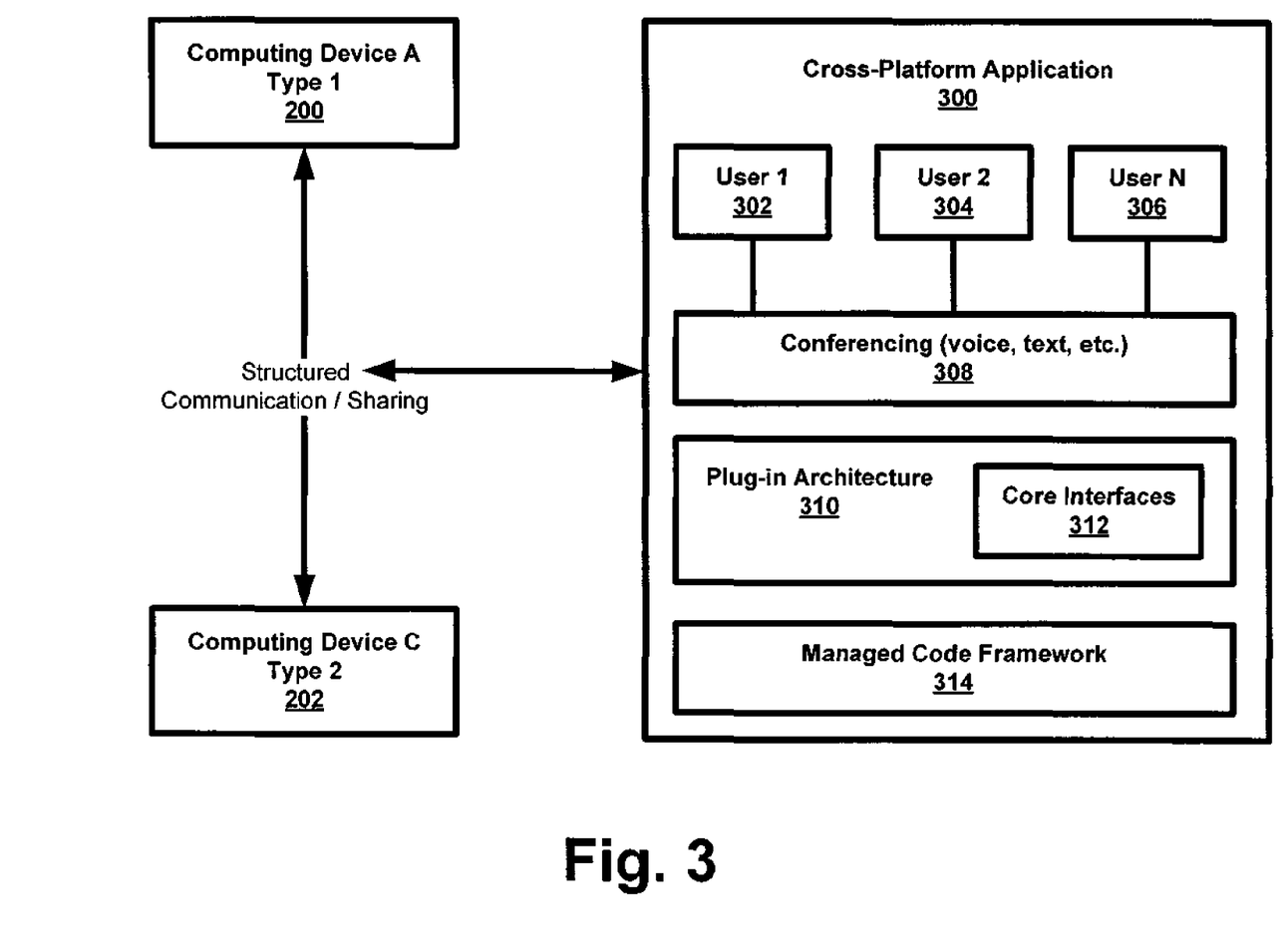
FIG. 3 illustrates how cross-platform interaction can be accomplished using an application and/or plug-in architecture.

Next, FIG. 3 illustrates how cross-platform interaction can be accomplished using an application and/or plug-in architecture. In FIG. 3, computing device A 200, of type 1, interacts with computing device C 202, of type 2. In one aspect of the presently disclosed subject matter, such communication and/or sharing of data can be accomplished using a cross-platform application 300. This application 300 can support a plurality of users 302, 304, 306, on different and remote computing devices. These devices may be of different types, as discussed above, including PCs, gaming consoles, and so on. Using the cross-platform application, users 302, 304, 306 can conference 308 using voice, text, video and other communication means.

Furthermore, the cross-platform application 300 can support a plug-in architecture. Thus, various plug-in modules can be developed and used to interact with the core application 300. Such plug-in modules can include various computing solutions, whether to added to or enhance voice, text, and/or video communication and/or photo, music, and/or video sharing and the like. One way this can be accomplished by the plug-in architecture 310 is by exposing core interfaces 312 which can be used to design the appropriate interfaces built in the aforementioned plug-in modules. The core interfaces 312 can mediate control of various functionalities, such as (1) graphics devices, so that plug-ins can draw, (2) input, so that plug-ins can take and handle certain inputs, (3) networking, so that plug-ins can synchronize data across various users, and so on.

In a further aspect of the presently disclosed subject matter, the cross-platform application can be platform agnostic. By way of example and not limitation, the application 300 can interact with a managed code framework, such as .NET. This may allow for the leveraging of managed code for the aforementioned interaction, and it may also allow for different types of codes to interact via an intermediate language provided by the managed code framework. It will be well understood by those skilled in the art, that various cross-platform runtimes can be used to accomplish this goal (not just .NET), and that in some other aspects of the disclosed subject matter, such managed code frameworks do not have to be used.

Where managed runtimes are used, they can provide a basic model or namespace for process control, input control, networking (including notification of users entering or leaving a session, and the ability to address and send packets to any users), graphics rendering, access to local storage, and the like. Native applications interacting with such runtimes can provide the basic functionality for finding modules on local devices or hosted on online services, they can also provide for the launching of such modules, switching between concurrently running modules, many-to-many text, voice, video chat, and so on.

Some of the other exemplary and non-limiting features of native applications include: hosting managed runtimes that actually run the modules; providing input to the modules, including text, voice, video, controller, storage, and so on; providing output from the modules, including text, voice, video, graphics, storage, and so on; providing means of rendering output from the gadgets; providing means of inviting other parties to join an experience; maintaining persistent text, voice, video chat across all users. These are just some of the plurality of features of the native application, as it is manifested variously in other parts of this application, whether as a cross-platform application 300 in FIG. 3 or a native application 414 in FIG. 4.

Figure 4:
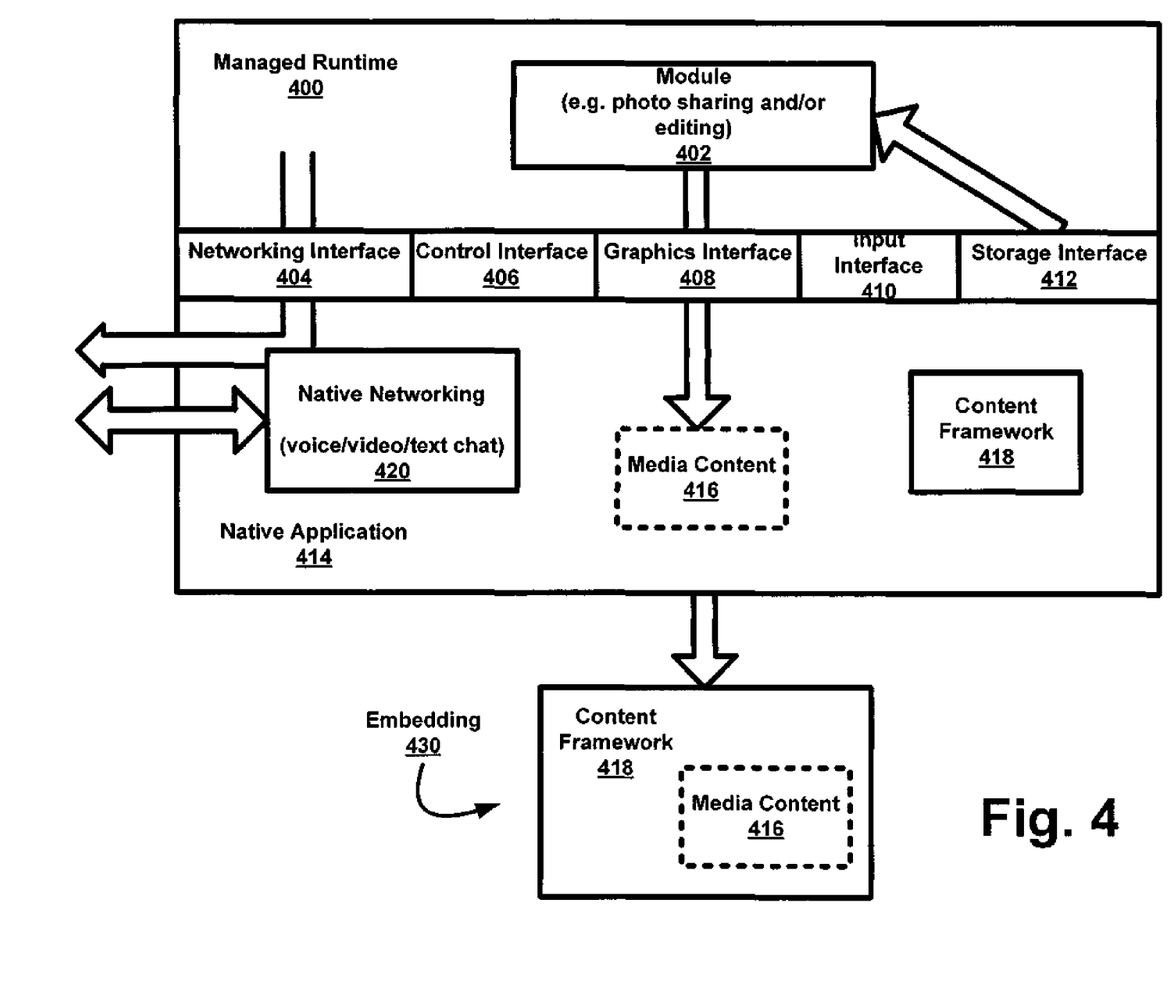
FIG. 4, illustrates an exemplary scenario of a basic media content sharing module interacting with a native application.

Turning now to FIG. 4, it illustrates an exemplary scenario of a basic media content sharing module interacting with a native application. It should be noted at the outset, that "media content" includes any content discussed throughout herein (and storable on any tangible medium), thus this term is inclusive rather than exclusive. Furthermore, the term "content" herein includes any "data" and/or "code," as these terms are understood by those of skill in the art. In FIG. 4, a module 402, which may be a photo sharing and/or editing plug-in or some other applet, provides some media content 416, for instance, a picture (although, the notion of "media content" is not limited to pictures, text, and such data, but rather also can include gaming content, video and/or audio content, and so on). This media content 416 can be conveyed to a native application 414 via a graphics interface 408. The native application 414 can provide a content framework 418, for instance, some kind of applet or program, such as voice chat or text chat. Thus, the net result can be that the media content 416 can be embedded 430 in the content framework 418, just as a picture might be embedded or pasted into a chatting program. And, moreover, in other aspects of the presently disclosed subject matter, the media content 416 and the content framework 418 might be one and the same (e.g. a console game). Finally, this media content 416 can then be shared with other users via the native networking 420 functionalities of the native application 414.

The native application 414 can provide various functionalities, such as maintenance of state and exposure of interfaces to allow for interaction with other remote hosts and clients. In the former case, the application 414 can maintain a consistent state across a plurality of computing devices, such as those separated across a network. By way of example and not limitation, the application 414 can answer inquires regarding various connections between various modules (e.g. socket state). In the latter case, again, by way of example and not limitation, a networking interface 404 can help in sharing the aforementioned media content 416 with various users across various platforms; the control interface 406 can allow for manipulation of the content 416 in various ways; the graphics interface 408 can allow for obtaining graphics content; the input interface 410 can allow for input that can have an effect on media content; and, the storage interface 412 can allow for control of various storage schemes. These interfaces 404, 406, 408, 410, and 412 exposed by the native application 414 are merely exemplary and non-limiting. Other interfaces are contemplated herein also, as is apparent in reading the surrounding context disclosed in the present disclosure.

The application 414 itself can reside on various computing devices, whether stationary or mobile, PCs or laptops, PDAs, and cell phones, and so on. The application 414 may be embodied as a full program or as an applet. It can function in a peer-to-peer network architecture, or in a client-server architecture. As will be apparent in the discussion associated with FIGS. 9 and 10, the application can reside in various software, hardware, or firmware settings, and interact with other computing devices and/or modules over various types of networks.

Figure 5:
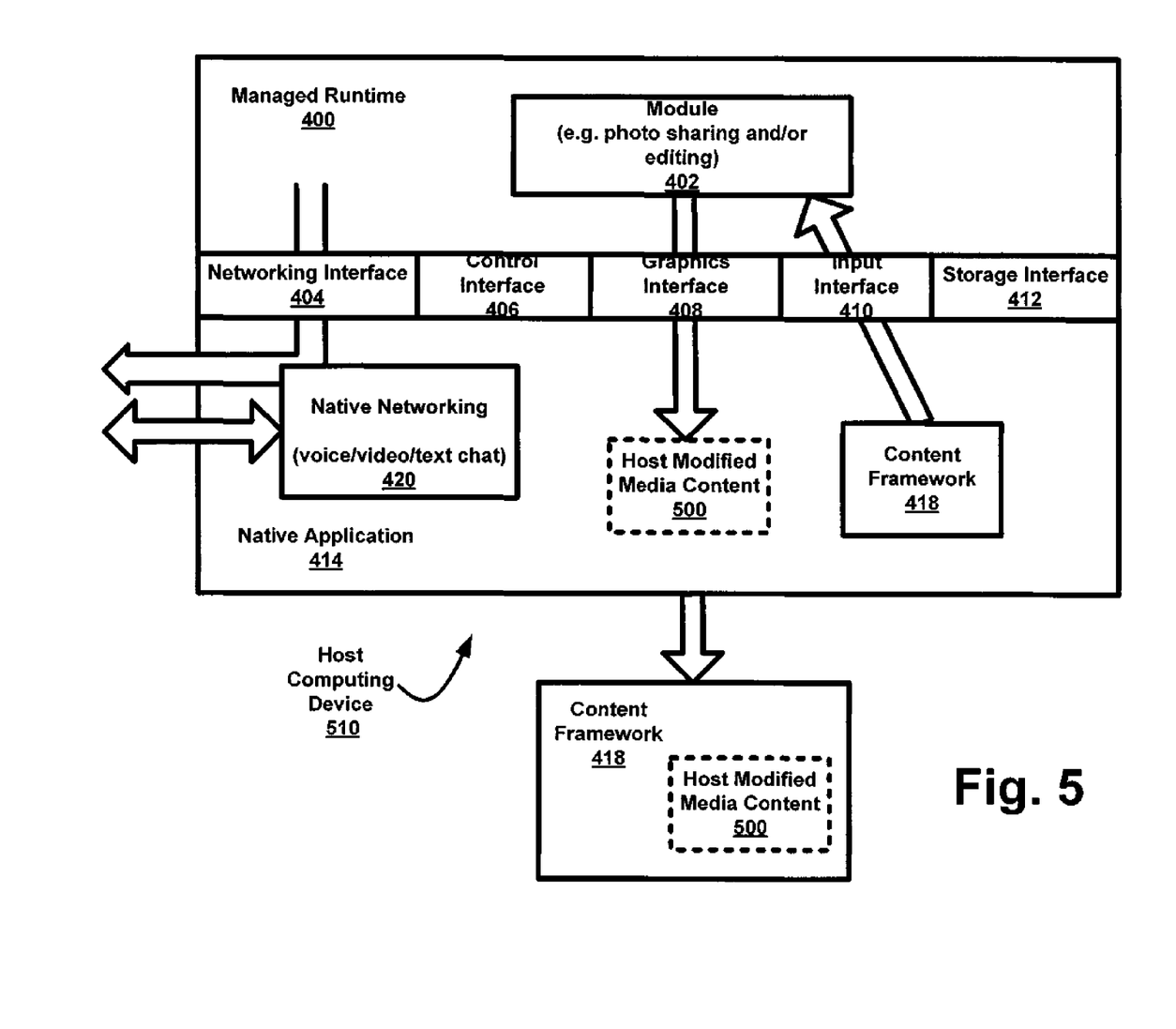
FIG. 5 builds on the subject matter of FIG. 4, disclosing a host modified media content scenario.

FIG. 5 builds on the subject matter of FIG. 4, disclosing a host modified media content scenario. The original media content 416 embedded 430 in the content framework 418, as shown in FIG. 4, can be modified via a user interface of the content framework 418 (as was discussed above, this framework 418 can be any kind of program, application, or applet, whether graphics based, text based, video based, and so on). Thus, per FIG. 5, a user can manipulate the media content 416 via a user interface of the framework 418, and this manipulation can be conveyed to the module 402 via the input interface 410. Next, a new (host) modified media content 500 can be conveyed to and framed in the framework 418. This new content 500 can then be shared with other applications running on remote (whether physically remote or logically remote) computing devices, so that changes performed on the host 510 can be reflected in such other computing devices.

Figure 6:
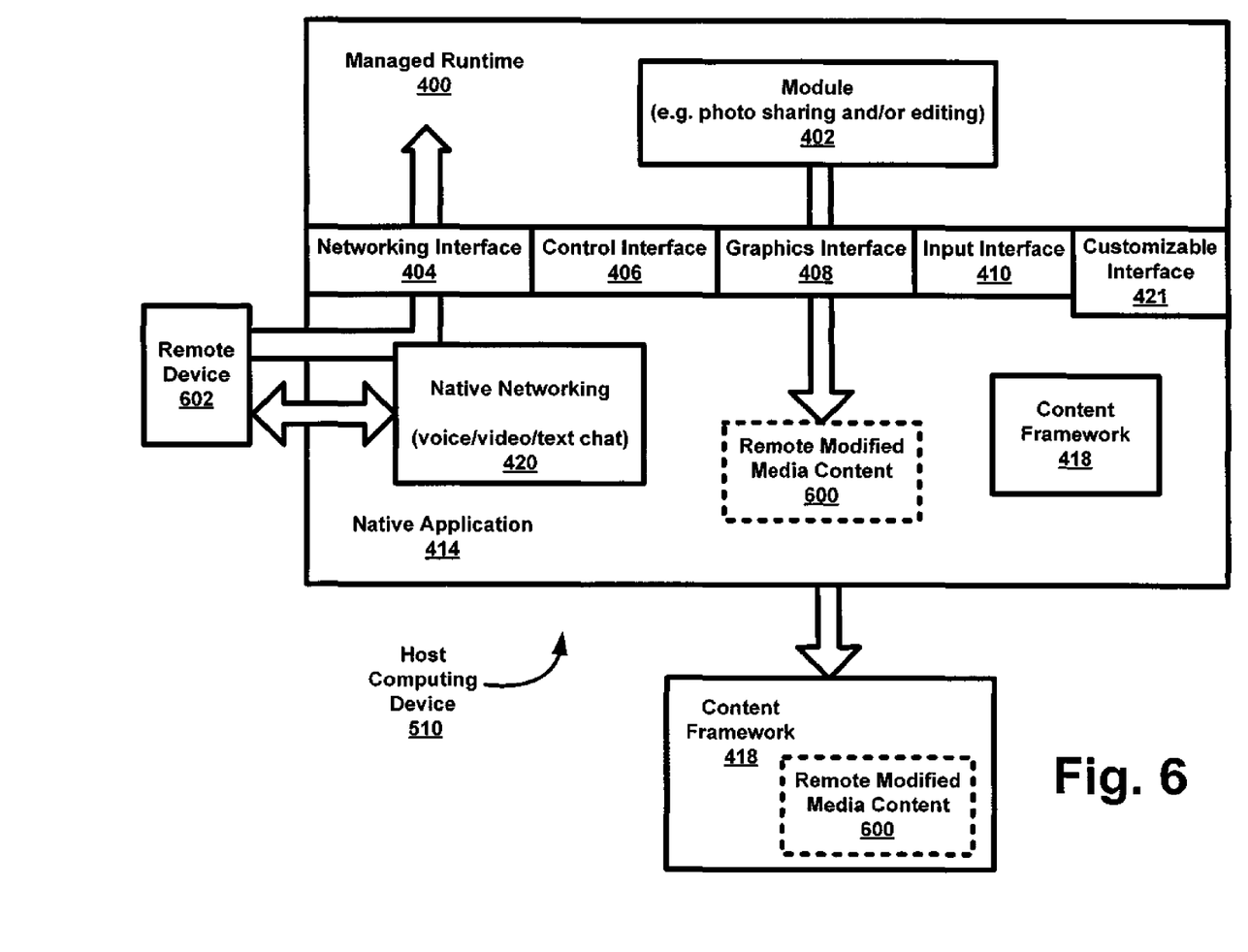
FIG. 6 still further builds on FIGS. 4 and 5, by showing the effects of a remote computing device modified media content.

FIG. 6 still further builds on FIGS. 4 and 5, by showing the effects of a remote computing device modified media content. The host modified content 500 of FIG. 5 can still be further modified by remote users on different (or the same) platforms. According to FIG. 6, a remote device 602, having a first platform type, can change the modified content 500 shown in FIG. 5 so that the changes can appear as remote modified media content 600. These changes can appear within the content framework 418 provided by the native application 414. Specifically, the networking interface 404 can relay any changes from the remote device 602 to the appropriate module 402 so that this module 402 can then render these changes onto the modified content 500, thus resulting in the remote modified content 600.

In short, the native application 414, which may be embodied as a standard application, or a program, and/or an applet, can reside on any computing device wanting to communicate and/or share data with (even more broadly speaking, interact with) another computing device, where such devices may have the same or different platforms. One way to accomplish this task is for any application native to a given computing device, such as application 414, to provide some core interfaces 312 (shown in FIG. 3), as exemplified by such interfaces as the networking interface 404, control interface 406, graphics interface 408, input interface 410, and/or storage interface 412.

Such interfaces, can also be extensible beyond the disclosed herein set of interfaces. For instance, as is shown in FIG. 6, a customizable interface 421 can be provided, where this interface can expose access to various functionalities, such as GPS data, camera data, and so on. Thus, the customizable interface 421 can stand in for any type of interface that allows any module to communicate with the host computing device 510 special purpose functionality or devices, such as GPS, Bluetooth, camera, or motion detector devices. Moreover, the native application 414 can be associated with a managed runtime code 400, such as .NET., so that various modules or plug-ins can be used to interact with the native application 414.

Thus, in another aspect of the presently disclosed subject matter, the functionality of the native application 414 can manifest itself in at least three different architectures: (1) a native application, running on device (e.g. a console—but not limited thereto, as any computing device is contemplated herein), can host sessions among various other applications running on other devices; (2) modules that communicate with other modules on different devices can do so via dynamically linked libraries (DLLs), instead of a native application (where a DLL can be present on each device communicating with another device, and it can be downloaded from on online source, either for a first time install or to resolve versioning issues with other DLLs; it should be noted, moreover, that specialized operating system support may be required to ensure service continuity across module reboots, e.g. maintaining video chats across module loads); and (3) an operating system (OS) can manage native applications (i.e. it can oversee the communication traffic discussed above, with reference to FIGS. 4, 5, and 6). Anyone of these three setups is consistent with the subject matter disclosed herein, and it can be employed in the desired form, depending on the need.

The application 414 (or, in the alternative, the DLLs or an OS supervised application) can be responsible for maintaining connections between modules. It can specify the properties of such modules (e.g. module 402) and how modules are connected with each other. As is indicated below, such connection can be in a peer-to-peer context or a server-client context. Moreover, in the native application architecture, for example, host migration can occur when a session host migrates from one console to another console (e.g. in the scenario where the former console withdraws from a session). Thus, one advantage of the presently disclosed subject matter is that developers can save time in managing connections between various modules on various consoles, since native applications running on each such consoles can guarantee connectivity.

Figure 7:
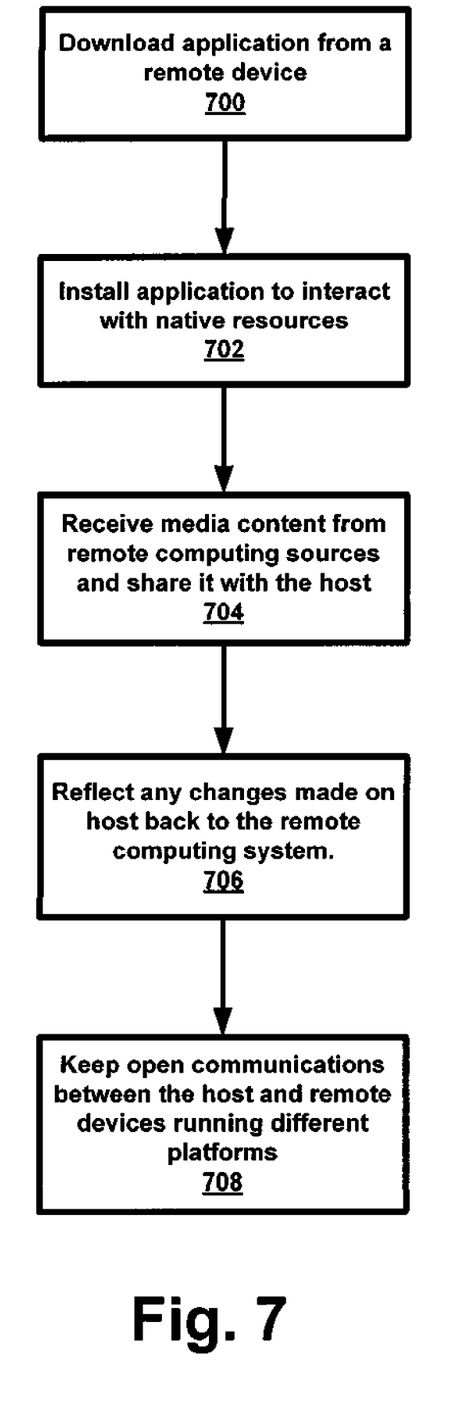
FIG. 7 illustrates an exemplary block diagram flow chart of making, using, providing, and the like the cross-platform application mechanisms.

Lastly, FIG. 7 illustrates an exemplary block diagram flow chart of making, using, providing, and the like the cross-platform application mechanisms. At block 700, the aforementioned application (for instance, application 414) can be downloaded onto a computing device from a remote source. It should be noted, however, that it can be preloaded onto the computing device. Next, at block 702, one the application is downloaded, it can be installed to interact with native host computing resources, such as runtime managed code. Once, installed, it can be used to perform a variety of function, as mentioned above, and additional functions such as data synchronization, real-time updating, and the like.

The installing of this application allows for computing devices with different platforms to communicate and/or share data with each other, whether those platforms include standard PC operating system, mobile operating systems, closed operating systems (where the notion of "closed" system includes a non-general purpose computer, such as a gaming console that allows only certain type of code to run, such as signed code), and so on.

At block 704, the application is configured to receive media content from remote devices and share such content with the native or host computing device. Such media content can then be manipulated by the host computing system, and any changes in the media content can be reflected back to the remote system, as is shown in block 706. Still furthermore, the application discussed above can interact with modules, such as plug-in programs, application, or applets that are local to the application or that are remote to the application (that is, residing on a different computing device, whether physically or logically—such as in a virtual machine scenario). Lastly, at block 708, the application can keep open communications between the host and remote devices running different platforms (while, for example, sharing data in blocks 700-706). As mentioned, such communications can include text, voice, video, audio and may further include any other kind of electronic communication.

Figure 8:
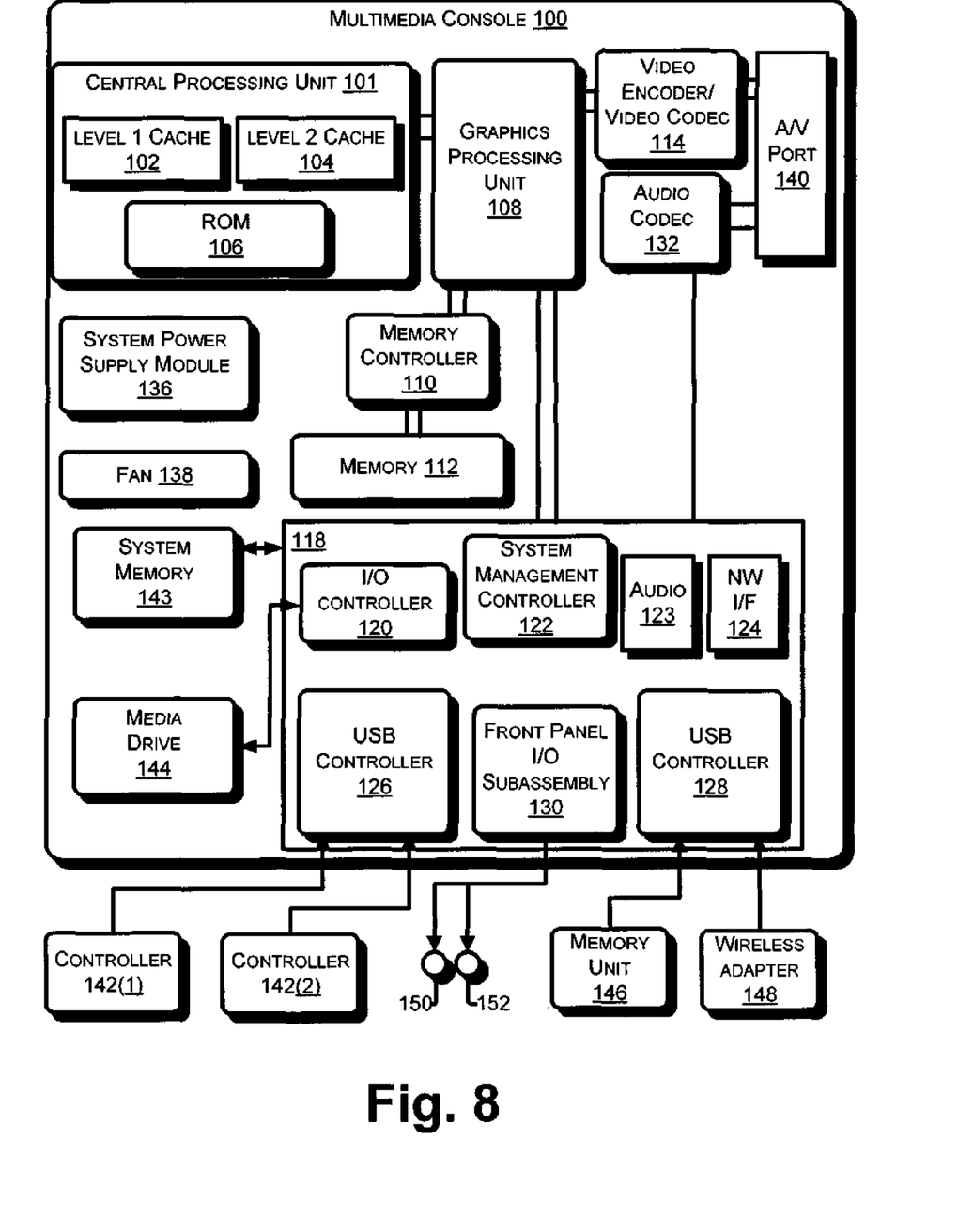
FIG. 8 illustrates in block diagram form an exemplary multimedia console that can be used in conjunction with the various aspects of cross-platform applications discussed with reference to FIGS. 1-7 and 9.

In should be noted that in another aspect of the present disclosure, having the application in place, whenever users press any controller 142(1), 142(2) buttons (as shown in FIG. 8), this signal can be intercepted by the application, and manipulated thereby, before passing on any command to the intended recipient. In this manner, the application can manage control flow of any console, such as having the ability to select different modules (whether locally or over a network).

The net effect is that the application provides for computing system that allows for easy sharing of data between closed computing systems.

In one exemplary and non-limiting aspect of the presently disclosed subject matter, video and/or chat threads can be maintained as to provide the appearance that video and/or chat are always available (even when an application reboot occurs). Other aspects of communicated data, such as voice data can appear seamless across any data loads (whether these loads include video, pictures, games, and so on).

III. Exemplary Computing Devices and Networks For Online Content

The above discussed computing devices, whether native (e.g. hosts 510) or remote 602, can be embodied as gaming consoles, music players, PCs, and other such devices having different, similar, or the same platforms. Contemplated herein are also hand-held devices, laptops, cell phones, and so on. Referring to FIG. 8, a block diagram shows an exemplary multimedia console that can be used in conjunction with the various aspects of cross-platform applications discussed above. This console, which includes a game oriented console or a PC, may comprise, for example, digital audio processing functionality. Specifically, in FIG. 8, a multimedia console 100 is shown, with a central processing unit (CPU) 101 having a level 1 (L1) cache 102, a level 2 (L2) cache 104, and a flash ROM (Read-only Memory) 106. The level 1 cache 102 and level 2 cache 104 can temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase can be stored in a flash memory device (not shown). Further, ROM 106 can be located separately from the CPU 101. These memory devices can cache parts or the entirety of the above mentioned applications, programs, applets, managed code, and so on.

A graphics processing unit (GPU) 108 and a video encoder/video codec (coder/decoder) 114 can form a video processing pipeline for high speed and high resolution graphics processing. Data can be carried from the graphics processing unit 108 to the video encoder/video codec 114 via a bus. The video processing pipeline can output data to an A/V (audio/video) port 140 for transmission to a television or other display. A memory controller 110 can be connected to the GPU 108 and CPU 101 to facilitate processor access to various types of memory 112, such as, but not limited to, a RAM (Random Access Memory).

The multimedia console 100 can include an I/O controller 120, a system management controller 122, an audio processing unit 123, a network interface controller 124, a first USB host controller 126, a second USB controller 128 and a front panel I/O subassembly 130 that can be preferably implemented on a module 118. The USB controllers 126 and 128 can serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 can provide access to a network (e.g., the Internet, home network, etc.) and may be any of a wide variety of various wired or wireless interface components including an Ethernet card, a modem, a Bluetooth module, a cable modem, and the like.

System memory 143 can be provided to store application data that is loaded during the boot process. A media drive 144 can be provided and can comprise a DVD/CD drive, hard drive, or other removable media drive, etc. The media drive 144 can be internal or external to the multimedia console 100. Application data can be accessed via the media drive 144 for execution, playback, etc. by the multimedia console 100. The media drive 144 can be connected to the I/O controller 120 via a bus, such as a Serial ATA bus or other high speed connection (e.g., IEEE 1394).

The system management controller 122 can provide a variety of service functions related to assure the availability of the multimedia console 100. The audio processing unit 123 and an audio codec 132 can form a corresponding audio processing pipeline with high fidelity, 3D, surround, and stereo audio processing according to aspects of the presently disclosed subject matter above. Audio data can be carried between the audio processing unit 123 and the audio codec 126 via a communication link. The audio processing pipeline can output data to the A/V port 140 for reproduction by an external audio player or device having audio capabilities.

The front panel I/O subassembly 130 can support the functionality of the power button 150 and the eject button 152, as well as any LEDs (light emitting diodes) or other indicators exposed on the outer surface of the multimedia console 100. A system power supply module 136 can provide power to the components of the multimedia console 100. A fan 138 can cool the circuitry within the multimedia console 100.

The CPU 101, GPU 108, memory controller 110, and various other components within the multimedia console 100 can be interconnected via one or more buses, including serial and parallel buses, a memory bus, a peripheral bus, and a processor or local bus using any of a variety of bus architectures.

When the multimedia console 100 is powered on or rebooted, application data can be loaded from the system memory 143 into memory 112 and/or caches 102, 104 and executed on the CPU 101. Such application data can include some of the online derived data. The application may also present a graphical user interface that provides a consistent user experience when navigating to different media types available on the multimedia console 100. In operation, applications and/or other media contained within the media drive 144 can be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community. As such a participant, it may interact with computing devices, whether PCs or servers, and receive information that may be eventually stored.

Figure 9:
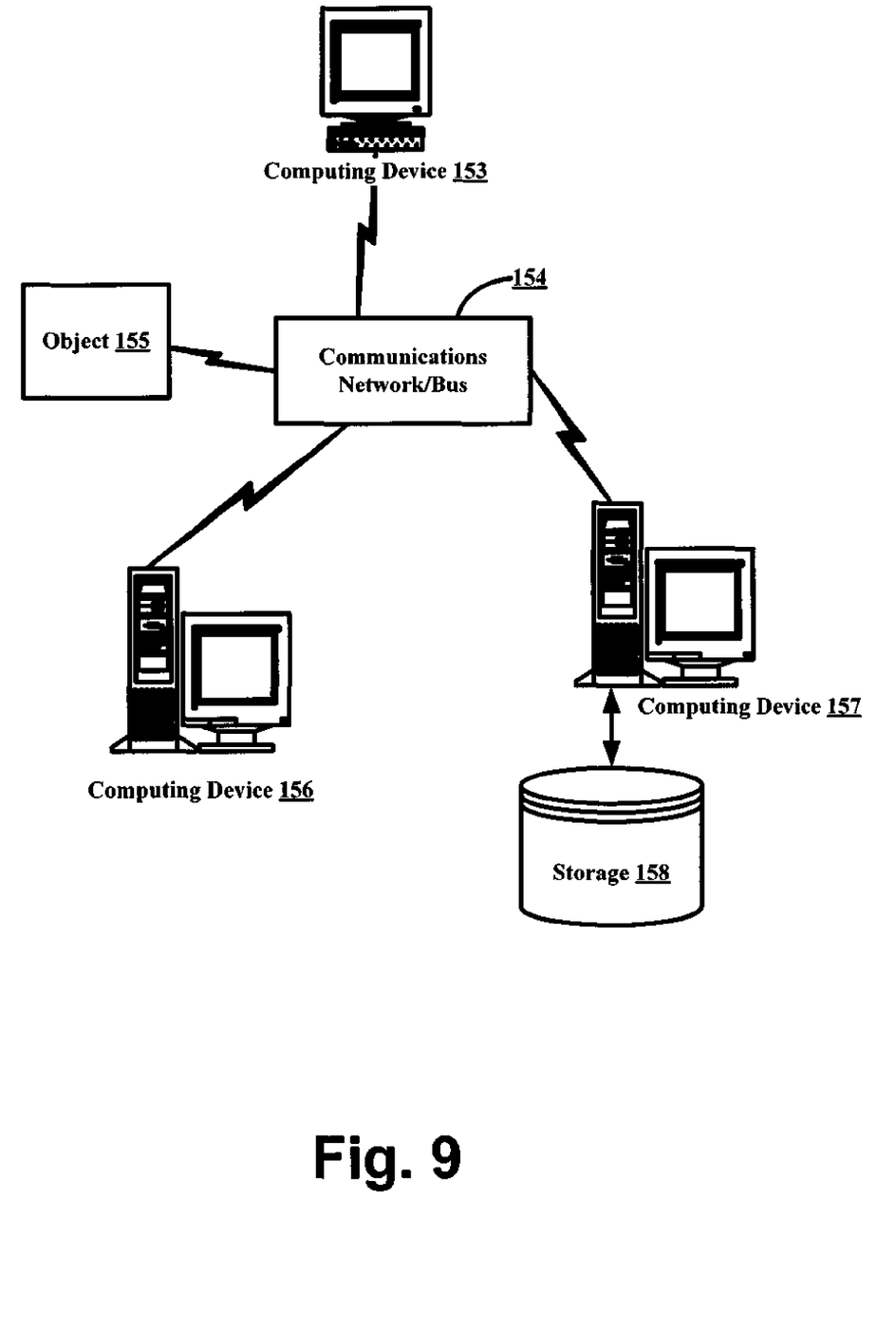
FIG. 9 illustrates an exemplary networking environment for subject matter discussed with reference to FIGS. 1-8.

Next, FIG. 9 illustrates an exemplary networking environment for subject matter discussed with reference to FIGS. 1-8. The above discussed gaming console 100 can correspond to any one of the computing devices 153, 156, 157, or it can be distributed over such devices 153, 156, 157. It can interact with various other objects 155 and storage devices 158 via a communications network/bus 154, where such objects and devices can correspond to other computing devices (whether hardware, firmware, or software). The cross-platform applications can communicate in peer-to-peer networks or client-server based networks, depending on the implementation.

Finally, it should also be noted that the various techniques described herein may be implemented in connection with hardware or software or, where appropriate, with a combination of both. Thus, the methods and apparatus of the presently disclosed subject matter, or certain aspects or portions thereof, can take the form of program code (i.e., instructions) embodied in tangible storage media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing application programming interface (API) or the like, are preferably implemented in a high level procedural or object oriented programming language to communicate with a computer system. However, the program(s) can be implemented in assembly or machine language, if desired. In any case, the language may be a compiled or interpreted language, and combined.

Any language used by the presently disclosed aspects can contain instructions to perform a variety of tasks. Thus, for example, a native runtime can maintain connections required to maintain, for instance, voice/video chat across module loads; a native application can expose to the modules knowledge about the users attached to a current session (in this way, modules can be always aware, the moment they start up, of who is currently connected); as is shown in FIG. 4, for example, a native application 414 can be the actual content framework 418 (in this case, the application 414 could run private modules that display information and a user interface (UI) related to a current session, e.g. having the ability to visualize who else is in the session, and having the UI to actually manipulate data, e.g. invite people, kick people off, emote, start a new module, and make everyone in the session start the new module as well, etc.); it could also provide personal services unrelated to the session (e.g. stock ticker, news, email, etc.); and, the native application can also provide other rich services to the modules, e.g. special abilities like GPS information from a cell phone or other attached hardware, rich profile data from users attached to the session, and so on.

And yet, while the present disclosure has been described in connection with a plurality of exemplary aspects, as illustrated in the various figures and discussed above, it is understood that other similar aspects may be used or modifications and additions may be made to the described aspects for performing the same function of the present disclosure without deviating therefrom. For example, in various aspects of the disclosure, processes and methods were described for the interaction between and/or among cross-platform computing devices. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A system for allowing cross-platform interaction between a plurality of computing devices, comprising:
   a first computing device having a first platform; and
   a second computing device having a second platform which lacks a sharing mechanism that allows structured cross-platform interaction with said first platform of said first computing device;
   a managed runtime environment;
   a native application that interacts with the managed runtime environment to provide a plurality of functions, said native application comprising:
      a content framework program that embeds a first content into a content framework; and
      a native networking function that operates as a sharing mechanism to allow structured cross-platform interaction between said first computing device and said second computing device, the structured cross-platform interaction comprising sharing of said first content embedded in said content framework.

2. The system according to claim 1, wherein said first content is received from a module configured for at least one of sharing said first content or editing said first content.

3. The system according to claim 1, wherein said content framework in which said content is embedded, is at least one of a voice chat program or a text chat program.

4. The system according to claim 1, wherein said native application is configured to allow communication and sharing of data between said first computing device and said second computing device in at least one of text, voice, and video format.

5. The system according to claim 4, wherein said communication and sharing of data occurs over a peer-to-peer network.

6. The system according to claim 1, wherein said native application is configured to interact with said first computing device in real-time.

7. The system according to claim 1, wherein said managed runtime environment is .NET.

8. The system according to claim 1, wherein said native application is downloaded from a remote source.

9. The system according to claim 1, wherein said second computing device includes a set of extensible interfaces.

10. The system according to claim 1, wherein at least one of said first computing device and said second computing device is a closed device.

11. The system according to claim 1, wherein at least one of said first computing device and said second computing device is a mobile device.

12. A computer readable storage medium bearing computer executable instructions for allowing cross-platform interaction between a plurality of computing devices, comprising:
   an instruction configured to provide cross-platform interaction by embedding content inside a content framework and transferring the embedded content from a host computing device having a first platform to a remote computing device having a second platform that is incompatible for carrying out structured cross-platform interaction with said first platform; and
   an instruction which is part of a native application that receives modified content from the remote computing device and interfaces with a managed runtime environment in the host computing device to provide the modified content to a module via at least one of a set of interfaces.

13. The computer readable storage medium according to claim 12, wherein said content is at least one of text, voice, and video data.

14. The computer readable storage medium according to claim 12, further comprising an instruction for downloading a native application onto said host computing device.

15. A method for allowing communication and sharing of data between a plurality of devices of different types, comprising:

retrieving content from a storage device;

sending said content to a native application;

receiving said content by said native application running on a first platform of a host computing device;

embedding said content in a content framework running on said host computing device, said content framework comprising at least one of a voice chat program or a text chat program; and providing the embedded content to a remote computing device having a second platform that lacks structured cross-platform interaction compatibility with said first platform, said native application that interacts with a managed runtime environment in the host computing device to provide cross-platform interaction between said host computing device and said remote computing device.

16. The method according to claim 15, wherein said retrieving of said content is performed by a plug-in device associated with said host computing device.

17. The method according to claim 15, wherein at least one of said plurality of computing devices is a closed device.

* * * * *